Figure 1:
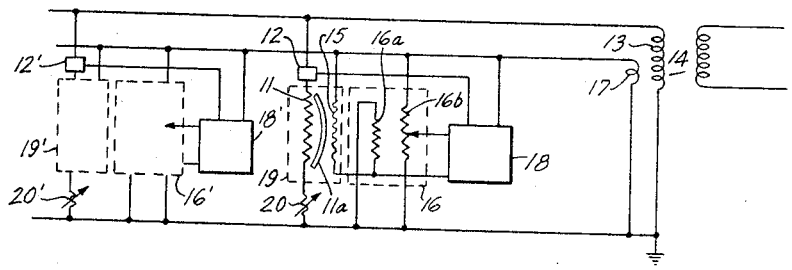

Oct. 18, 1966    A. A. CHUBB    3,280,306

CONTROL APPARATUS

Filed Dec. 31, 1963

INVENTOR.
Alexander Albert Chubb
BY

United States Patent Office 3,280,306
Patented Oct. 18, 1966

3,280,306
CONTROL APPARATUS
Alexander Albert Chubb, Birkenhead, England, assignor to Ernest Scragg & Sons (Holding) Limited
Filed Dec. 31, 1963, Ser. No. 334,741
Claims priority, application Great Britain, Jan. 1, 1963, 43/63
14 Claims. (Cl. 219—499)

This invention provides improvements in or relating to control apparatus.

According to the invention, there is provided apparatus to control the supply of electrical energy to an electric heating element comprising a controlled rectifier capable of rectifying an alternating current and of supplying an electric heating element with the current rectified, and temperature sensitive means adapted to control the rectifier in accordance with variations in a temperature to which the temperature sensitive means are subjected.

The temperature sensitive means may be connected in a bridge circuit adapted to compare an electric output of said temperature sensitive means with an electric reference quantity.

The apparatus may comprise an amplifier, preferably comprising transistors, adapted to amplify the output of the bridge circuit.

The controlled rectifier may be controlled by an electric quantity varying in amplitude or in phase with the said temperature.

The controlled rectifier may comprise a controlled silicon rectifier or a thyratron.

The temperature sensitive means may comprise a thermocouple, a temperature sensitive resistance or a thermistor.

The apparatus may comprise two controlled rectifiers adapted to give controlled full-cycle rectification, or may comprise a rectifier adapted to rectify half-cycles alternating with the half-cycles rectified by the controlled rectifier so that the current supply to the heating element comprises alternate controlled and complete half-cycles.

The temperature sensitive means may be adapted to respond to a temperature obtaining in the region of the heating element, and may be adapted to maintain that temperature within a small range about a mean temperature which can be selected. The apparatus may comprise means adapted to permit selection of said mean temperature.

The apparatus may be adapted to control an electric heating element for heating a travelling textile yarn. The invention also comprises apparatus as herein described in combination with an electric heating element, which may be an electric resistance heating element. The invention also comprises apparatus as herein described in combination with an electric heating element and a plate, adapted to be heated by the element, in contact with which a textile yarn can run. The plate and the element may be thermally insulated from their surroundings.

The invention also comprises apparatus adapted to control the supply of electric energy to a plurality of electric heating elements, comprising a plurality of apparatus as herein described, whereof the several controlled rectifiers are connected to a common source of electric current.

The invention also comprises apparatus adapted to control the supply of electric energy to a plurality of electric heating elements, comprising a plurality of apparatus as herein described, and comprising means operable to select severally mean temperatures to obtain in the region of each of the heating elements.

The invention also comprises apparatus adapted to control the supply of electric energy to a plurality of electric heating elements, comprising a plurality of apparatus as herein described, and comprising means operable to select simultaneously a mean temperature to obtain in the region of all of the heating elements.

The invention also comprises apparatus adapted to control the supply of electric energy to a plurality of electric heating elements, comprising a plurality of apparatus as herein described, and a plurality of adjustable means each adapted to permit adjustment only of a single heating element.

The invention also comprises apparatus adapted to control the supply of electric energy to a plurality of electric heating elements, comprising a plurality of apparatus as herein described, wherein a line common to all of said plurality of apparatus and adapted to carry an electric reference quantity with which the outputs of the temperature sensitive means are to be compared is connected to each apparatus through a high impedance so that no one apparatus affects the operation of any other apparatus.

Figure 2:
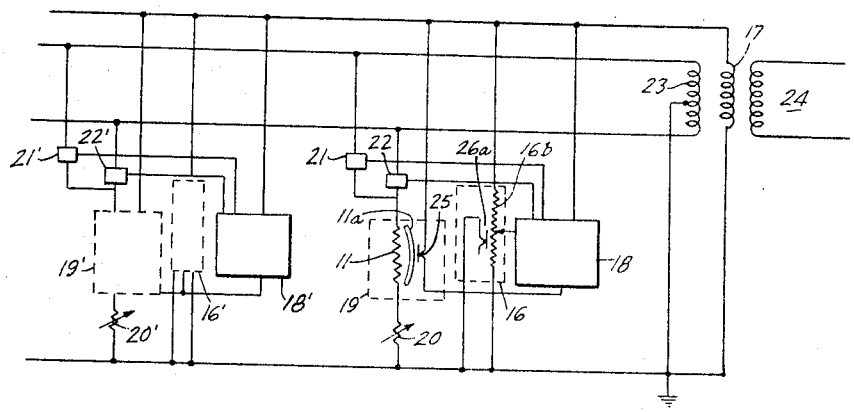
Figure 3:
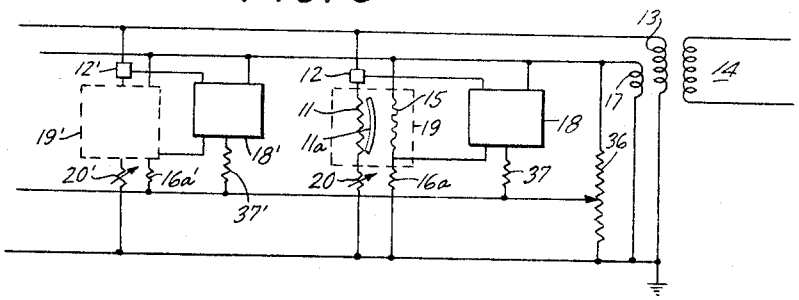

Embodiments of apparatus according to the invention will now be described with reference to the accompanying drawings in which:

FIGURE 1 is a circuit diagram of one embodiment,
FIGURE 2 is a circuit diagram of another embodiment, and
FIGURE 3 is a circuit diagram of another embodiment.

FIGURE 1 illustrates apparatus adapted to control the supply of electrical energy to an electric resistance heating element 11 comprising a controlled rectifier 12 which rectifies an alternating current from a winding 13 of a mains transformer 14 and supplies the electric heating element 11 with the current rectified, and temperature sensitive means 15, comprising a temperature sensitive resistance (for example, of platinum) or a thermistor, adapted to control the rectifier 12 in accordance with variations in the temperature to which the temperature sensitive means are subjected.

The temperature sensitive resistance 15 is connected in a bridge circuit (indicated generally at 16) adapted to compare the potential across the resistance 15, with a reference potential, the source of these potentials being a winding 17 of the transformer 14. The bridge circuit comprises a fixed resistance 16a and a variable potentiometer 16b.

The output of the bridge circuit 16 is fed to a transistor amplifier-comparator 18, to which is also fed reference potential from the winding 17, and which feeds to the rectifier 12 a controlling quantity, varying in amplitude or phase with the temperature of the resistance 15.

The rectifier 12 may be a controlled silicon rectifier or a thyratron.

The heating element 11 is arranged to heat a curved metal plate 11a, in contact with which a textile yarn can run, and the element 11, the plate 11a and the resistance 15, when enclosed in a thermally insulated container 19, together form a yarn heater suitable for use in a textile yarn processing machine. The arrangement is such as to maintain the temperature obtaining in the region of the heating element 11 or plate 11a within a small range about a mean temperature, which can be selected by adjustment of the bridge potentiometer 16b.

All of the heater of a textile yarn processing machine may be controlled in this way. FIGURE 1 shows, in outline, a second yarn heater 19', and associated rectifier 12', bridge circuit 16' and amplifier-comparator 18', the several rectifiers 12, 12', . . . being connected to a common source of electric current, namely the winding 13. The potentiometers 16b, 16b', . . . are operable to select severally mean temperatures to obtain in the region of each of the heating elements 11 or plate 11a.

A presettable trimming resistance 20, 20', . . . is provided in series with each heating element 11, 11', . . . for initial adjustment of the machine.

FIGURE 2 illustrates an arrangement like that illustrated in FIGURE 1 (like parts being indicated by like reference numerals), except that two controlled rectifiers 21, 22; 21′, 22′, ... are provided for each heating element 11, 11′, ... providing controlled full-cycle rectification of current from a winding 23 of the transformer 24, centre-tapped to earth, both rectifiers associated with each heater 19, 19′, ... being controlled in accordance with the temperature of the temperature responsive means, which, in this embodiment, is a thermocouple 25, a cold thermocouple 26a forming the other arm of the bridge circuit.

In an alternative arrangement, one of the rectifiers 21, 22 is not controlled, so that the current supply to the heating element 11 comprises alternate controlled and complete half-cycles.

FIGURE 3 illustrates an embodiment similar to the arrangement illustrated in FIGURE 1, except that instead of each heater 19, 19′, ... having in its associated bridge circuit 16, 16′, ... a variable potentiometer 16, 16′, ... a potentiometer 36 is provided which is common to all of the heaters 19, 19′, and which is operable to select simultaneously a mean temperature to obtain in the regions of all of the heating elements 11, 11′, ... or plates 11a, 11a′, .... The remaining components of the several bridge circuits are severally connected to the common potentiometer 36 through high impedances comprising resistances 37, 37′, ... so that no one heater and associated circuitry affects the operation of any of the others.

What I claim is:

1. Yarn heating apparatus, comprising
a plurality of spaced electric yarn heating elements;
a source of electrical energy;
a plurality of pairs of controlled rectifiers each pair connected to supply current in opposite directions to a corresponding one of said heating elements;
connecting means connecting each of said series circuit arrangements to said source of electrical energy;
a plurality of temperature sensing means each positioned in operative proximity with a corresponding one of said heating elements, each of said temperature sensing means producing an indicating electrical signal which varies in magnitude in accordance with the temperature of the corresponding heating element;
a plurality of reference means each producing an electrical reference signal;
a plurality of bridge circuit means each connecting a corresponding one of said temperature sensing means with the corresponding one of said reference means in a bridge circuit for comparing the corresponding indicating signal with the corresponding reference signal to provide a control signal having a magnitude dependent upon the temperature of the corresponding one of said yarn heating elements; and
a plurality of control means each connected between a corresponding one of said bridge circuit means and the corresponding one of a pair of said controlled rectifiers associated with one yarn heating element for operating said corresponding one of said controlled rectifiers to transfer electrical energy from said source of electrical energy to the corresponding yarn heating element in accordance with the temperature of said corresponding yarn heating element.

2. Yarn heating apparatus as claimed in claim 1, wherein each of said controlled rectifiers is a silicon controlled rectifier.

3. Yarn heating apparatus as claimed in claim 1, wherein each of said controlled rectifiers is a thyratron.

4. Yarn heating apparatus as claimed in claim 1, wherein each of said yarn heating elements comprises an electrical resistance.

5. Yarn heating apparatus as claimed in claim 1, wherein each of said temperature sensing means comprises a temperature sensitive resistor.

6. Yarn heating apparatus as claimed in claim 1, wherein each of said temperature sensing means comprises a thermistor.

7. Yarn heating apparatus as claimed in claim 1, wherein each of said temperature sensing means comprises a thermocouple.

8. Yarn heating apparatus as claimed in claim 1, wherein each of said control means includes a transistor amplifier.

9. Yarn heating apparatus as claimed in claim 1, further comprising a plurality of variable trimming resistors each connected in series with a corresponding one of said series circuit arrangements.

10. Yarn heating apparatus as claimed in claim 1, wherein each of said bridge circuit means includes a variable resistance connected in the corresponding bridge circuit for setting a reference level for the temperature of the corresponding yarn heating element.

11. Yarn heating apparatus as claimed in claim 1, wherein a single reference means produces an electrical reference signal for each of said plurality of bridge circuit means.

12. Yarn heating apparatus as claimed in claim 11, wherein said single reference means produces said electrical reference signal from said source of electrical energy.

13. Yarn heating apparatus as claimed in claim 1, wherein each of said controlled rectifiers comprises a pair of silicon controlled rectifiers and said source of electrical energy comprises transformer means having a winding having a center tap connected to a point at ground potential, a first end terminal connected to one of the pair of silicon controlled rectifiers of each of said controlled rectifiers and a second end terminal connected to the other of the pair of silicon controlled rectifiers of each of said controlled rectifiers.

14. Yarn heating apparatus as claimed in claim 1, wherein each of said controlled rectifiers comprises a rectifier and a silicon controlled rectifier and said source of electrical energy comprises transformer means having a winding having a center tap connected to a point at ground potential, a first end terminal connected to the rectifier of each of said controlled rectifiers and a second end terminal connected to the silicon controlled rectifier of each of said controlled rectifiers.

References Cited by the Examiner
UNITED STATES PATENTS

| | | | |
|---|---|---|---|
| 3,040,157 | 6/1962 | Hukee | 219—501 |
| 3,136,877 | 6/1964 | Heller | 219—501 |
| 3,149,224 | 9/1964 | Horne et al. | 219—497 |
| 3,159,737 | 12/1964 | Dora | 219—501 |
| 3,166,246 | 1/1965 | Fielden | 219—494 X |

RICHARD M. WOOD, *Primary Examiner.*

ANTHONY BARTIS, *Examiner.*

L. H. BENDER, *Assistant Examiner.*